United States Patent [19]
Fauteux et al.

[11] Patent Number: 5,724,721
[45] Date of Patent: Mar. 10, 1998

[54] ELECTRODE MASK APPLICATION PROCESS FOR FORMING AN ELECTROLYTIC CELL

[75] Inventors: Denis G. Fauteux, Acton; Martin Van Buren, Chelmsford, both of Mass.

[73] Assignee: Mitsubishi Chemical Corporation, Tokyo, Japan

[21] Appl. No.: 757,229

[22] Filed: Nov. 27, 1996

Related U.S. Application Data

[60] Provisional application No. 60/008,435, Dec. 11, 1995.
[51] Int. Cl.$^6$ ................................................ H01M 10/12
[52] U.S. Cl. .................................. 29/623.5; 29/623.1
[58] Field of Search ........................ 29/623.5, 623.1

[56] References Cited

U.S. PATENT DOCUMENTS

| | | | |
|---|---|---|---|
| 4,173,066 | 11/1979 | Kinsman | 29/623.1 |
| 4,614,026 | 9/1986 | Plasse | 29/623.3 |
| 5,089,027 | 2/1992 | Rossoll et al. | 29/623.2 |
| 5,279,624 | 1/1994 | Rossoll et al. | |
| 5,314,507 | 5/1994 | Rossoll | 29/623.4 |
| 5,350,645 | 9/1994 | Lake et al. | 429/124 |
| 5,362,579 | 11/1994 | Rossoll et al. | 429/162 |
| 5,431,701 | 7/1995 | Kagawa et al. | 29/623.2 |
| 5,437,941 | 8/1995 | Arledge et al. | 429/129 |

*Primary Examiner*—John S. Maples
*Attorney, Agent, or Firm*—Dick and Harris

[57] ABSTRACT

The present invention is directed to an electrode mask for use in an electrolytic cell, and an associated process for fabricating such a cell with an electrode mask. The electrode mask is applied to a limited portion of the active material of at least one of the first and second electrodes so that the peripheral edge of the electrode mask and associated electrodes are in planer relationship with each other. In addition, the electrode mask can be applied in a manner which enables a fully fabricated electrolytic cell to be manufactured with any desired geometric configuration, merely by altering the electrode mask application pattern, and a die-cutter to cut an assembled cell in conformance with the applied pattern of the electrode mask.

11 Claims, 1 Drawing Sheet

ELECTRODE MASK APPLICATION PROCESS FOR FORMING AN ELECTROLYTIC CELL

This application depends from provisional patent application Ser. No. 60/008,435, entitled ELECTRODE MASK, filed Dec. 11, 1995.

BACKGROUND OF THE INVENTION

The present invention is directed to an electrode mask and an associated application process for applying the electrode mask onto an electrode, and, in turn, for use of the electrode mask within an electrolytic cell.

PRIOR ART

A recurrent problem associated with electrolytic cells constructed with liquid or polymer electrolyte systems has been electrical shorting of the completely fabricated cell. Specifically, such shorting has been the result of adjacently positioned electrodes physically coming into contact with each other due to, among other things, non-planar alignment of the edges of the various components of the cell with each other.

In an effort to combat such shorting in liquid electrolyte systems, membrane separators which physically extend beyond the peripheral edges of the associated electrodes have been used. With respect to polymer electrolyte systems, prior art cells have been constructed with one electrode having its peripheral edge extend beyond the peripheral edge of the other electrode. While such a solution has reduced the likelihood of shorting, it does, unfortunately, result in unbalanced electrodes having different electrochemical activity at their respective ends, as compared to their respective center sections.

Additionally, in polymer electrolyte systems, the prior art has also attempted to align pre-cut frames/masks adjacent and planar with the ends of the electrodes. Unfortunately, alignment of such pre-cut frames has proven to be extremely difficult. Furthermore, if the frame is too big (quite often the case inasmuch as handling and operative placement of relatively small pre-cut components is extremely difficult, if not impossible) it will cover too much of the active material of the respective electrodes. This, in turn, results in a loss of usable surface area, which thus results in a loss of energy density.

SUMMARY OF THE INVENTION

The present invention is directed to an electrolytic cell comprising a first electrode having an outer peripheral edge and an active material, a second electrode having an outer peripheral edge and an active material, and, an electrolyte. The outer peripheral edges of the first and second electrodes each define a peripheral geometry, wherein the outer peripheral geometry of the first electrode is in alignment with and conforms to the outer peripheral geometry of the second electrode. The electrolytic cell includes an electrode mask having an outer peripheral edge, operatively applied onto a pre-selected limited portion of the active material of at least one of the first and second electrodes. The peripheral edge of the electrode mask is applied in planer relationship with the outer peripheral edge of the corresponding one of the first and second electrodes, so as to result in an electrode mask having a peripheral geometry corresponding to the peripheral geometry of the associated first and second electrodes.

In a preferred embodiment of the invention, the electrode mask is electrochemically inert with the first and second electrodes and the electrolyte. Furthermore, the electrode mask may comprise a polymerizable compound, or, a hot melt compound, such as molten polypropylene, wax, silicone sealants etc. Furthermore, such material can be applied onto the electrode material by either painting, spraying, heat transfer, printing or silk screening method.

In another preferred embodiment of the invention, the electrolytic cell includes means for providing uniform electrochemical activity within the electrolytic cell. The uniform electrochemical activity means comprises means for inactivating a portion of the active material of at least one of the associated first and second electrodes to which the electrode mask has been operatively applied.

The invention further includes a process for fabricating an electrolytic cell comprising the steps of: a) fabricating a first electrode within an active material; b) fabricating a second electrode within an active material; c) creating an electrode mask by applying an electrochemically inert, curable medium (which is likewise contemplated to comprise/include a material which can be applied by heat transfer), relative to the first and second electrodes and associated electrolyte, onto a pre-selected limited portion of the active material of at least one of the first and second electrodes; d) applying the electrolyte to the electrochemically inert medium, and, in turn, to the associated one of the first and second electrodes; e) attaching the other one of the first and second electrodes to the electrolyte so that at least a portion of the electrolyte is sandwiched between the first and second electrodes and, is, in turn, on top of the electrochemically inert medium, and, whereby the other one of the first and second electrodes has at least a peripheral region adjacent the applied electrochemically inert medium thereby resulting in a fabricated electrolytic cell.

In a preferred embodiment of the process, the electrochemically inert medium and the electrolyte are subjected to a curing/polymerizing phase. It is contemplated that the curing/polymerization of the electrochemically inert medium be done partially and/or prior to curing/polymerization of the electrolyte, as well as simultaneously with the electrolyte. In addition, it is also contemplated that the active material of the electrodes are partially cured/polymerized prior to application of the electrochemically inert medium, wherein they will be subjected to further curing either prior to or simultaneously with curing/polymerization of the electrolyte. In addition, the process further contemplates applying the electrochemically inert medium in a predetermined pattern on the associated first and second electrodes, so as to result in an applied electrochemically inert medium having at least an inner predetermined peripheral geometric configuration.

The process further comprises the step of cutting the fully fabricated electrolytic cell into a geometric configuration conforming to, yet at least slightly larger than, the inner predetermined geometrical configuration of the applied electrochemically inert medium, whereby, the outer peripheral edges of the first and second electrodes and the electrolyte as well as the electrochemically inert medium are planer with each other, so that none of the edges overlap each other or extend beyond the other.

The process also comprises the step of providing uniform electrochemical activity within the fabricated electrolytic cell. This is accomplished through inactivating a portion of the active material of the electrode, with a neutralizing material, to which the electrochemically inert medium has been applied to. This neutralizing material is then allowed to seep into the associated active material prior to curing/polymerizing the electrolyte and/or the electrochemically inert medium.

As will be understood, the present process contemplates fabrication of an electrolytic cell through utilization of a continuous "flexible" feed operation. Indeed, inasmuch as the actual geometrical configuration of the fully fabricated cell is controlled through manipulation of an electrode mask spraying device and a die-cutting device, there is no need to exchange the particular webs of material with webs having different physical dimensions—inasmuch as altering of the final geometric configuration is merely done by altering the spray pattern of the electrode mask spraying device and then altering the die-cutter to correspond to the sprayed pattern.

BEST MODE FOR CARRYING OUT THE INVENTION

Figure 1:
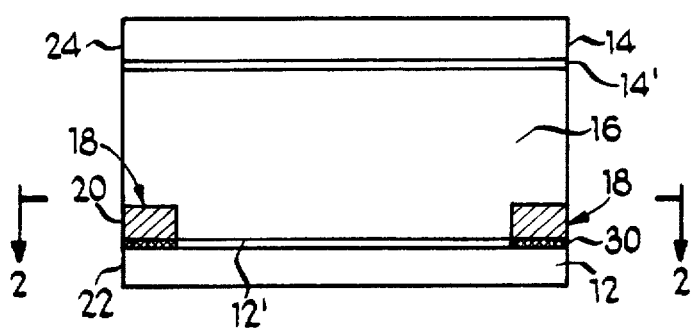
FIG. 1 of the drawings is a front elevated cross-sectional view of the present invention.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiments so illustrated.

Electrolytic cell 10 is shown in FIG. 1 as comprising first electrode 12, second electrode 14, electrolyte 16 and electrode mask 18. For purposes of the present disclosure, first electrode 12 and second electrode 14 will be understood to include an active material 12', 14', respectively, of known composition, and electrolyte 16 will be understood to be a conventional liquid or polymer electrolyte.

Figure 3:
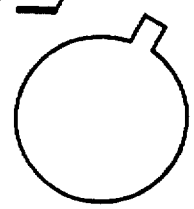
FIG. 3 of the drawings is another preferred embodiment of the present invention.
Figure 4:
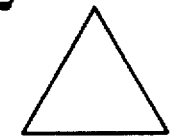
FIG. 4 of the drawings is yet another preferred embodiment of the present invention.
Figure 2:
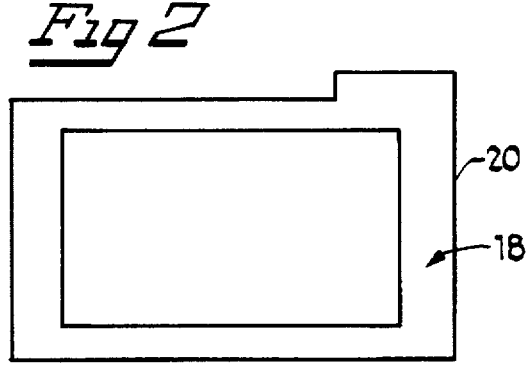
FIG. 2 of the drawings is a cross-sectional view of FIG. 1, taken along lines 2—2.
Figure 5:
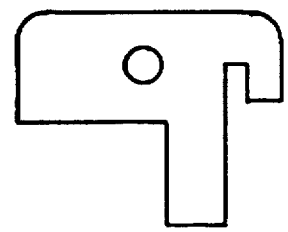
FIG. 5 of the drawings is still another preferred embodiment of the present invention.

As seen in FIG. 1 and FIG. 2, electrode mask 18 is applied onto a pre-selected limited portion of active material 12' of first electrode 12, wherein outer peripheral edge 20 (of electrode mask 18), is in planer relationship with outer peripheral edge 22 of first electrode 12 and, in turn planer with outer peripheral edge 24 of second electrode 14. (See FIG. 1). Accordingly, electrode mask 18 has an outer peripheral geometry corresponding to the outer peripheral geometry of the associated first and second electrodes. Indeed, as will be further explained, such an outer peripheral geometry can result in electrolytic cells of various configurations, such as substantially rectangular (FIG. 2), substantially circular (FIG. 3), substantially triangular (FIG. 4), substantially arbitrary (FIG. 5), etc. The variation in product configurations are virtually unlimited.

While the particular material to be used for electrode mask 18 would be easily understood to those with ordinary skill in the art, having the present disclosure before them, some acceptable examples include polymerizable compounds, as well as various hot melts, such as polypropylene, wax and silicone sealants. Of course, other material are likewise contemplated provided they are, among other things, electrochemically inert with respect to the remainder of the components of the electrolytic cell, can be applied in a curable/polymerizable medium, and will not jeopardize the mechanical and chemical integrity of the cell. Furthermore, although reference will be made to the electrode mask as being fabricated from an electrochemically inert curable medium, the term curable should be understood to be interchangeable with the term polymerizable, and, as previously identified, such a medium is likewise/alternatively contemplated to comprise a heat transferable material.

Means for providing uniform electrochemical activity 30 is shown in FIG. 1 as comprising a neutralizing material, actually formulated with the electrode mask material, which has been allowed to seep into active material 12' of first electrode 12. This neutralizing material actually serves to inactivate that portion of the active material which would otherwise be ionically and electronically conductive. Inasmuch as neutralization occurs directly below the surface area of electrode mask 18, the remaining active portion of active material 12' will have a relatively uniform geometry; within and below the confines of the internal peripheral border of electrode mask 18, to, in turn, enable uniform electrochemical conductivity and greater energy density of the cell. Although the drawings show application of the neutralizing material, and, in turn, electrode mask 18 on only one of the electrodes, it is also contemplated that another electrode mask (and, if desired, neutralizing material) be applied to either or both of the electrodes.

Figure 6:
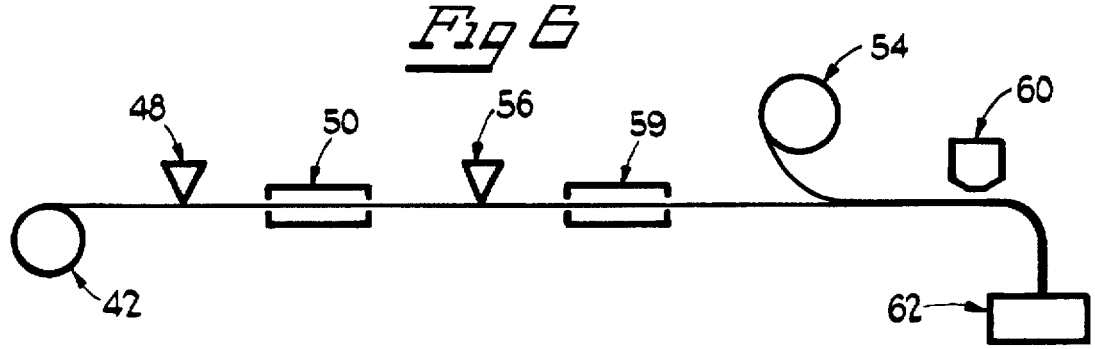
FIG. 6 of the drawings is a schematic diagram of the process of the present invention.

A schematic diagram of the process for fabricating an electrolytic cell of the present invention is shown in FIG. 6, wherein actual fabrication is done on a continuous web fed system comprising: web of first electrode material 42, electrode mask applicator device 48; first optional curing/polymerizing station 50, electrolyte applicator 56, second optional curing/polymerizing station 59, web of second electrode material 54, die-cutter 60 and final product collection zone 62. It will be understood that the first and second electrode material each include at least an associated active material thereon (not shown).

Figure 7:
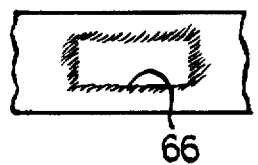
FIG. 7 of the drawings is a top view of a partially fabricated electrolytic cell.
Figure 8:
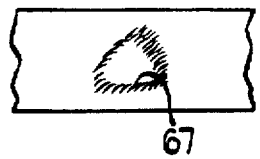
FIG. 8 of the drawings is a top view of a partially fabricated electrolytic cell.

In operation, web of first electrode material 42 is continuously moving at a predetermined rate. As the first electrode material moves, it is exposed to electrode mask applicator device 48 wherein an electrochemically inert curable medium is applied onto the surface of the electrode material, through, for example, spraying, rolling, painting, silk screening or any other method which would enable applying the electrochemically inert medium onto a pre-selected limited portion of the active material of the first electrode material. Specifically, the particular portion of active material to be applied with the electrochemically inert medium will correspond to a predetermined geometrical configuration of the final fully fabricated electrolytic cell. Accordingly, electrode mask applicator device 48 will be programmed, through conventional programming techniques, to apply the electrochemically inert curable medium onto the electrode material in a pattern having at least an inner peripheral geometric configuration 66, 67 (as shown in FIGS. 7 and 8) similar to the desired outer peripheral geometric configuration of the fully fabricated electrolytic cell.

After the electrochemically inert curable medium has been operatively applied in the desired geometric pattern on the electrode material, it will then be exposed to first curing/polymerizing station 50. Depending upon the composition of the material, the curing/polymerizing station may comprise UV, an oven, or any other conventional means for curing or polymerizing material. Although first curing/polymerizing station has been identified for use, it is also contemplated that curing/polymerization of the electrochemically inert material be delayed until simultaneous curing/polymerization can occur with the particular electrolyte. Alternatively, it may be desirable to only partially cure/polymerize the electrochemically inert curable material at first curing/polymerizing station 58, and then fully cure/polymerize the electrochemically inert curable material after application of the electrolyte, and, at the same curing/polymerizing station as the electrolyte (such as at second curing/polymerization station 59). In addition, although not shown, the process further contemplates utilization of a first electrode web of material having active material in a partially cured/polymerizable state, wherein full curing/polymerizing occurs in the same curing/polymerizing station as the electrochemically inert curable medium and/or the electrolyte.

After electrochemically inert curable material 18 has been operatively applied onto the electrode material (thereby forming an electrode mask), and either prior to or after curing/polymerization, a conventional electrolyte applicator 56 applies an electrolyte on top of adjacently positioned first electrode of the first electrode material 42 and in turn, on top of the applied electrode mask. Thereafter, the relevant portion of first electrode material is exposed to second curing/polymerizing chamber 59 which, as previously mentioned may cure/polymerize the electrolyte, electrode mask, and/or the partially cured active material (optional) of electrode material. Again, curing/polymerization can be done by conventional techniques. Also, it may be desirable to forego curing/polymerization of the electrolyte until after application of the second electrode material 14.

After the applied electrolyte has been at least partially cured, second electrode material, from second web 54, is applied onto the electrolyte. Inasmuch as the electrode mask is electrochemically inert with respect to the remainder of the cell components, and impervious to penetration by the electrolyte or active material of at least the electrode it is applied to, the electrolyte will be at least partially sandwiched between the active material of the first electrode and the active material of the second electrode and in contact with, but not through the electrode mask (See FIG. 1).

Once the second electrode material has been applied, and if the electrolyte is only partially cured/polymerized, the components would then be exposed to a further (not shown) curing/polymerizing process to fully cure/polymerize the electrolyte. From there, the fully assembled cell would pass to die-cutter 60 wherein the electrolytic cell would be cut into a predetermined geometric configuration; corresponding substantially to the inner geometric configuration of the previously applied electrode mask. As with electrode mask applicator device 48, die-cutter 60 will be programmed by conventional techniques to cut the electrolytic cell in the predetermined geometric configuration.

It is important to note that when the die-cut is made, the electrode mask will have its outer peripheral edges planer with the outer peripheral edges of the first and second electrode; so as to preclude any overlapping therebetween. Such alignment will ensure that the electrolytic cell will not short out as a result of such overlapping.

If another geometric shape of the final electrolytic cell is desired (e.g. circular, as opposed to rectangular), such would be accomplished simply by, for example, reprogramming the spray pattern of electrode mask applicator device 48 and die-cutter 60 in conformance with each other, and, in turn, the desired geometric configuration and product dimension. Such flexibility enables the use of webs of first and second electrode materials having the same web dimensions regardless of the desired geometry of the end product.

The foregoing description and drawings merely explain and illustrate the invention, and the invention is not limited thereto except insofar as the appended claims are so limited as those skilled in the art who have the disclosure before them will be able to make modifications and variations therein without departing from the scope of the invention.

What is claimed is:

1. A process for fabricating an electrolytic cell comprising the steps of:

fabricating a first electrode with an active material;

fabricating a second electrode with an active material;

creating an electrode mask by applying an electrochemically inert curable medium, relative to the first and second electrodes and an associated electrolyte, onto a limited portion of the active material of at least one of the first and second electrodes;

applying the electrolyte to the electrochemically inert medium, and, in turn, to the associated one of the first and second electrodes;

attaching the other one of the first and second electrodes to the electrolyte so that at least a portion of the electrolyte is sandwiched between the first and second electrodes and, is, in turn, on top of the electrochemically inert medium, and, whereby the other one of the first and second electrodes has at least a peripheral region adjacent the applied electrochemically inert medium.

2. The process according to claim 1 further comprising the step of curing the electrochemically inert medium and the electrolyte.

3. The process according to claim 2 wherein the step of curing the electrochemically inert medium occurs prior to the step of curing the electrolyte.

4. The process according to claim 2 wherein the steps of curing the electrochemically inert medium and the electrolyte occur substantially simultaneously.

5. The process according to claim 2 comprising the step of partially curing the electrochemically inert medium prior to the step of applying the electrolyte.

6. The process according to claim 1 wherein at least one of the first and second electrodes is fabricated with a curable active material which is in a partially cured state, wherein the process further includes the step of fully curing the active material after the step of applying the electrochemically inert medium onto the limited portion of the active material.

7. The process according to claim 1 wherein the step of applying the electrochemically inert medium onto the limited portion of the active material of at least one of the first and second electrodes includes the step of applying the electrochemically inert medium in a pattern so as to result in an applied electrochemically inert medium having at least an inner peripheral geometric configuration.

8. The process according to claim 7 further comprising the step of cutting the fully fabricated electrolytic cell into a geometric configuration conforming to, yet at least slightly larger than, the inner geometrical configuration of the applied electrochemically inert medium.

9. The process according to claim 1 further comprising the step of providing uniform electrochemical activity within the fabricated electrolytic cell.

10. The process according to claim 9 wherein the step of providing uniform electrochemical activity comprises inactivating a portion of the active material of the electrode to which the electrochemically inert medium has been applied through application of a neutralizing material within the electrochemically inert medium which will seep into the active material prior to curing of the electrolyte.

11. The process according to claim 1 wherein the step of applying the electrochemically inert medium is selected from the group of application methods selected from the group consisting of painting, spraying, rolling and silk screening.

* * * * *